US010554961B2

(12) United States Patent
Vora

(10) Patent No.: US 10,554,961 B2
(45) Date of Patent: Feb. 4, 2020

(54) THREE-DIMENSIONAL VOLUMETRIC DISPLAY USING PHOTOLUMINESCENT MATERIALS

(71) Applicant: Kevin Vora, Boston, MA (US)

(72) Inventor: Kevin Vora, Boston, MA (US)

( * ) Notice: Subject to any disclaimer, the term of this patent is extended or adjusted under 35 U.S.C. 154(b) by 279 days.

(21) Appl. No.: 15/346,400

(22) Filed: Nov. 8, 2016

(65) Prior Publication Data

US 2018/0131927 A1    May 10, 2018

(51) Int. Cl.
*G02B 27/00* (2006.01)
*H04N 13/39* (2018.01)
*G02B 27/22* (2018.01)
*H04N 13/398* (2018.01)
*H01S 3/00* (2006.01)

(52) U.S. Cl.
CPC ......... *H04N 13/39* (2018.05); *G02B 27/2292* (2013.01); *H04N 13/398* (2018.05); *H01S 3/0057* (2013.01); *H01S 3/0085* (2013.01)

(58) Field of Classification Search
CPC ...... H04N 13/39; H04N 13/398; H01S 3/005; H01S 3/0071; H01S 3/0085; H01S 3/0057; G02B 27/2292
See application file for complete search history.

(56) References Cited

U.S. PATENT DOCUMENTS

| | | | | |
|---|---|---|---|---|
| 2,904,697 A * | 9/1959 | Halsted | ................ | C09K 11/883 330/308 |
| 3,506,869 A * | 4/1970 | Loebner | .................. | H01L 33/00 313/499 |
| 4,665,923 A * | 5/1987 | Kobayashi | ............. | A61B 3/165 600/401 |
| 5,532,796 A * | 7/1996 | Narikawa | ............ | G03G 15/344 399/152 |
| 5,990,990 A * | 11/1999 | Crabtree | ............ | G02B 27/2278 345/6 |
| 6,064,423 A * | 5/2000 | Geng | ................. | G02B 27/2292 348/36 |
| 6,483,735 B1 * | 11/2002 | Rentzepis | .............. | B82Y 10/00 365/119 |
| 6,563,556 B2 * | 5/2003 | Nikol | ................ | G02F 1/133617 349/69 |
| 7,033,781 B1 * | 4/2006 | Short | ................... | C12N 15/102 435/6.16 |

(Continued)

*Primary Examiner* — Philip P. Dang

(74) *Attorney, Agent, or Firm* — Pepper Hamilton LLP

(57) ABSTRACT

In various aspects, volumetric display systems are disclosed together with methods for forming images. The volumetric display systems herein described are designed to generate high-quality and three-dimensional images with multiple-degree angle views and user interface. The images are generated from photoluminescent materials, often fluorescent materials, that are embedded in a three-dimensional solid display medium and excited by a pulsed laser beam. The excited fluorescent materials emit light that transmits through the display medium toward the viewer or viewers to create an image. The image can be dynamic when sequentially projected with other images. The disclosed systems can generate three-dimensional images with a single light source and without a high-power laser system operating on air or gas medium and interacting destructively with the imaging media.

21 Claims, 13 Drawing Sheets

(56) References Cited

U.S. PATENT DOCUMENTS

| | | | |
|---|---|---|---|
| 7,218,430 B2* | 5/2007 | Batchko | H04N 13/388 359/107 |
| 7,307,602 B1* | 12/2007 | Wedding | G09G 3/293 315/169.1 |
| 7,604,523 B1* | 10/2009 | Wedding | H01J 11/18 313/582 |
| 7,733,497 B2* | 6/2010 | Yun | A61B 5/0059 356/497 |
| 7,869,011 B2* | 1/2011 | Christensen | G01N 21/645 356/72 |
| 8,022,620 B2* | 9/2011 | Kobayashi | H01L 51/5265 313/113 |
| 8,113,898 B1* | 2/2012 | Wedding | H01J 11/18 313/582 |
| 8,215,815 B2* | 7/2012 | Meir | G02B 6/005 362/606 |
| 8,247,755 B2* | 8/2012 | Refai | G03B 21/26 250/208.1 |
| 8,289,274 B2* | 10/2012 | Sliwa | G02B 27/2271 345/108 |
| 8,368,303 B1* | 2/2013 | Wedding | H01J 11/18 313/582 |
| 8,384,624 B1* | 2/2013 | Guy | H01J 11/18 315/169.4 |
| 8,456,082 B2* | 6/2013 | Stiles | C09K 11/7721 313/506 |
| 8,791,053 B2* | 7/2014 | Christensen | B01J 19/0046 506/12 |
| 8,854,423 B2* | 10/2014 | Batchko | H04N 13/388 348/40 |
| 8,861,075 B2* | 10/2014 | Dantus | H01S 3/005 359/337.5 |
| 8,981,645 B1* | 3/2015 | Wedding | H01J 11/18 313/582 |
| 9,102,011 B2* | 8/2015 | Hosseini | B23K 26/0648 |
| 9,439,837 B2* | 9/2016 | Sibbett | A61K 6/033 |
| 9,552,972 B2* | 1/2017 | Cramer | H01J 49/0468 |
| 2003/0022105 A1* | 1/2003 | Prasad | A61K 41/008 430/270.15 |
| 2009/0210165 A1* | 8/2009 | Christensen | B01J 19/0046 702/22 |
| 2009/0264707 A1* | 10/2009 | Hendriks | A61B 5/0059 600/181 |
| 2010/0312312 A1* | 12/2010 | Jones | A61N 5/062 607/88 |
| 2011/0184244 A1* | 7/2011 | Kagaya | A61B 1/00117 600/182 |
| 2013/0190868 A1* | 7/2013 | Kahook | A61F 2/1648 623/6.41 |
| 2013/0271800 A1* | 10/2013 | Kanugo | G03H 1/2294 359/9 |
| 2014/0152801 A1* | 6/2014 | Fine | G02B 21/0008 348/79 |
| 2015/0005224 A1* | 1/2015 | Traynor | C11D 17/0095 510/447 |
| 2015/0034612 A1* | 2/2015 | Hosseini | B23K 26/0648 219/121.61 |
| 2015/0335741 A1* | 11/2015 | Smeltzer | A61K 41/0028 604/20 |
| 2015/0378243 A1* | 12/2015 | Kippelen | G02F 1/0126 359/244 |

* cited by examiner

THREE-DIMENSIONAL VOLUMETRIC DISPLAY USING PHOTOLUMINESCENT MATERIALS

FIELD

The present teachings generally relate to systems and methods utilizing pulsed laser light and light-emitting materials to generate images that are volumetric, three-dimensional, and/or dynamic.

BACKGROUND

Displaying visible information that is three-dimensional (3D) has been an ongoing challenge for display technologists. One way to address this challenge is by using volumetric display systems where an image is generated by the emission or scattering of light from a predefined space (along the x, y and z axis). The resulting 3D image can be captured from multiple-degree angles by the viewer without visual aid and rendered dynamic when sequentially projected with other images.

Volumetric display systems differ from more traditional 3D display systems where the information is projected on flat, two-dimensional media (along the x and y axis) and depth is simulated using visual effects. Examples of traditional 3D display systems include monitor and projector displays that generate 3D images using different techniques such as algorithm tracing, perspective, masking, and stereoscopy. Another example of traditional 3D display system employs a dynamic surface coupled to a light source, which generates 3D images when the dynamic surface moves at a certain speed. The mentioned-above examples are well known in the art and can generate images in three dimensions but are not compatible for multi-person tasks and off-angle viewing.

Recent technological advances in the area of display technology have created several avenues for producing dynamic 3D images, including holographic displays, swept-volume displays, and air-ionization displays. In practice, however, these technologies have many limitations—such as low resolution, low frame-rate, high cost, and high-system complexity—that have inhibited their use in a wide variety of applications.

Accordingly, there remains a need for improved methods and systems for the generation of 3D volumetric images that can provide high-quality dynamic images without high-power multiple light sources operating on air or gas medium and interacting destructively with the imaging media.

SUMMARY

Volumetric display systems are disclosed together with methods for forming images. The volumetric display systems herein described are designed to generate high-quality and three-dimensional images with multiple-degree angles view and user interface. Dynamic images with high frame rate can also be achieved. Generally speaking, the volumetric display systems according to the present teachings can generate 3D images using photoluminescent materials, which are in many embodiments fluorescent materials. In such embodiments, such materials can be embedded in a three-dimensional solid display medium and excited by a laser beam. The display medium is sufficiently transparent to incident light from the laser beam, emitted light from the fluorescent materials, to allow image formation and viewing of the image by a user. In some configurations, the laser beam can go through the transparent display medium to excite the fluorescent materials at one or more focal points within the display medium, and the excited fluorescent materials can emit light that propagates through the display medium and toward the user to generate an image. From the user perspective, the image can be captured from multiple-degree angles around the display medium and controlled by a control interface. It can also be rendered dynamic when sequentially projected with other images.

The volumetric display systems described herein include fluorescent materials that are embedded within one or more of the volumetric voxels of the display medium. The fluorescent materials are designed to absorb photons coming from the laser beam and emit light that enable the volumetric display system. This absorption/emission process can be achieved through the absorption of one or more photons, preferably two. The excitation intensity can be selected to cause multiphoton absorption of the laser radiation within the targeted voxels and to be below a threshold value so as to prevent damage to the display medium. Also, the excitation wavelength can be selected to be different than a wavelength that would cause linear absorption in the display medium while allowing multiphoton absorption.

The volumetric display systems herein described also can include a focusing system comprising one or more lenses to control the focusing of the laser beam inside of the display medium and to select the focal volume within the display medium where the fluorescent light emission occurs. In some embodiments, the intensity of the laser pulse within a focal volume is designed to be sufficiently high to cause multiphoton absorption of the radiation within that volume, and subsequently cause emission of radiation from that volume, whereas the intensity of the laser pulse outside the focal volume is designed to be generally below a threshold value needed for multiphoton absorption. In this manner, a laser pulse can propagate through the display medium without much absorption until it reaches the focal volume in which it can deposit its energy via multiphoton absorption. Hence, controlling the location of the focus inside the display medium can provide longitudinal (depth) control over where the emission light is produced. The focusing optics focal distance could be variable to provide a dynamic depth control of where the emission occurs inside the display medium.

The volumetric display systems herein described also include a laser radiation source that can be used to generate a plurality of ultrashort pulse sequences. By way of example, the pulse duration can be in a range of about 5 femtoseconds (fs) to about 1 nanosecond, e.g., in a range of about 10 fs to about 100 picoseconds (ps), or in a range of about 100 fs to about 1 ps, or in a range of about 500 fs to about 1 ps, the pulse repetition rate can be in a range of about 1 MHz to about 1 GHz, the central pulse wavelength can be in a range of about 700 nm to about 1600 nm, and the pulse energy can be in range of about 1 nJ to about 1000 nJ.

In some embodiments, a volumetric display system is disclosed, which includes a laser, a solid matrix, and a control system. The laser is designed to generate a plurality of pulses having a common central wavelength or multiple wavelengths. The plurality of pulses can also have a substantially common spectrum. Two laser pulses have a substantially common spectrum when they substantially contain the same spectral components at the same or different intensities. It is understood that the spectral components of two laser pulses having a common spectrum can nonetheless exhibit some differences relative to one another, e.g., due to noise. Such differences are typically less than about 5%. The control system is configured to receive the plurality of pulses and to focus the pulses into a plurality of focal volumes in said solid matrix to cause multi-photon absorption of said pulses in each of said focal volumes, thereby inducing emission of visible light at a wavelength shorter than the excitation wavelength(s) in said volumes to generate a three-dimensional image in said solid matrix. The solid matrix is selected to be substantially transparent to said laser pulse and to visible radiations.

In some embodiments, a volumetric display system is disclosed, which includes a plurality of functional elements that can be organized in a plurality of ways and controlled by one or more control systems. The functional elements include, without limitation and specific order, a laser radiation source that can generate a laser beam, a pulse compressor and/or pulse shaper that can control the pulse spectral amplitude and spectral phase (chirp), a modulator that can selectively shutter the laser beam, a focusing system that can focus the laser beam, a scanning mirror system that can control the position of the laser beam within the display medium, a display medium that can comprise one or more fluorescent materials and absorb the laser beam, a beam splitter that can split an incident laser beam into multiple laser beams, and a protection barrier that can protect one or more viewers' eyes from the laser pulses.

In some cases, the volumetric display systems describe herein include a pulse compressor and/or pulse shaper that can control the pulse chirp to obtain an optimal pulse duration for the absorption inside the display medium. Dispersion occurs when pulses propagate through material such as glass, air and gas. This causes different spectral components of the pulse to travel at different velocities, leading to a spreading of the pulse and therefore to an increase of the pulse duration and a decrease of the pulse peak power. To correct this dispersion, pulse compression optics can be used to shorten or lengthen pulses before or after they suffer dispersion by propagating through air, lenses, and other optics. In some other cases, the pulse compressor and/or pulse shaper can also help with controlling the depth at which a laser pulse will have sufficient intensity to initiate absorption. For example, the pulse compressor and/or pulse shaper can adjust the pulse chirp such that the change in the pulse duration (also called pulse width) due to dispersion as the pulse propagates to the display medium, and then within the display medium, would result in a minimum pulse width and/or high peak intensity at a desired depth within the display medium.

In some cases, the volumetric display systems described herein include a modulator that can selectively shutter the laser beam, or allow its passage to the display medium. This can enable a high rate of illumination of different volumetric voxels within the display medium by having the shutter moving the beam in and out of the beam path at a high speed. Acousto-optic modulators can be employed as the modulator, which can operate at high repetition rates to change the path of the laser in and out of the beam path. When moved out of the beam path, the laser can be blocked by a beam dump.

In some cases, the volumetric display systems described herein include a scanning mirror system that can control the positioning of the laser pulses within the display medium along the x and/or y axis. The scanning mirror system can be made of one or more mirrors that can collectively change the propagation direction of the laser beam so as to facilitate directing the beam to a desired location within the display medium.

In some cases, the volumetric display systems described herein include a protection barrier that can protect a viewer's eyes from the laser pulses that are applied to the display medium. The protection barrier can encase the display medium so as to block the laser light from exiting the display medium to reach a viewer, but let the display emission wavelength or wavelengths propagate through to the viewer.

BRIEF DESCRIPTION OF THE DRAWINGS

The invention will be more fully understood from the following detailed description taken in conjunction with the accompanying drawings, in which.

DETAILED DESCRIPTION

The present teachings relate generally to methods and systems for generating light emission, such as fluorescence, from one or many voxels within a 3D display medium. Various terms used below to describe the present teachings have their ordinary meanings in the art, unless stated otherwise. For example, the term "fluorescence" is used herein consistent with its customary meaning in the art to refer to radiation emitted by a substance (herein "fluorophore") as a result of excitation by an incident radiation at a shorter wavelength. The term "multiphoton absorption" is used herein consistent with its customary meaning in the art to refer to simultaneous absorption of multiple photons of identical or different frequencies to excite a molecule from one electronic state (typically the ground state) to a higher energy electronic state. An example of a multiphoton absorption is a two-photon absorption. The term "multiphoton fluorescence" as used herein refers to fluorescence radiation emitted by a substance in response to multiphoton absorption of excitation radiation by that substance. The term "about" as used herein denotes a maximum variation of 10% with respect to a property including numerical values. The term "substantially" as used herein denotes a deviation of at most 10% from a complete state, or condition.

Figure 1:
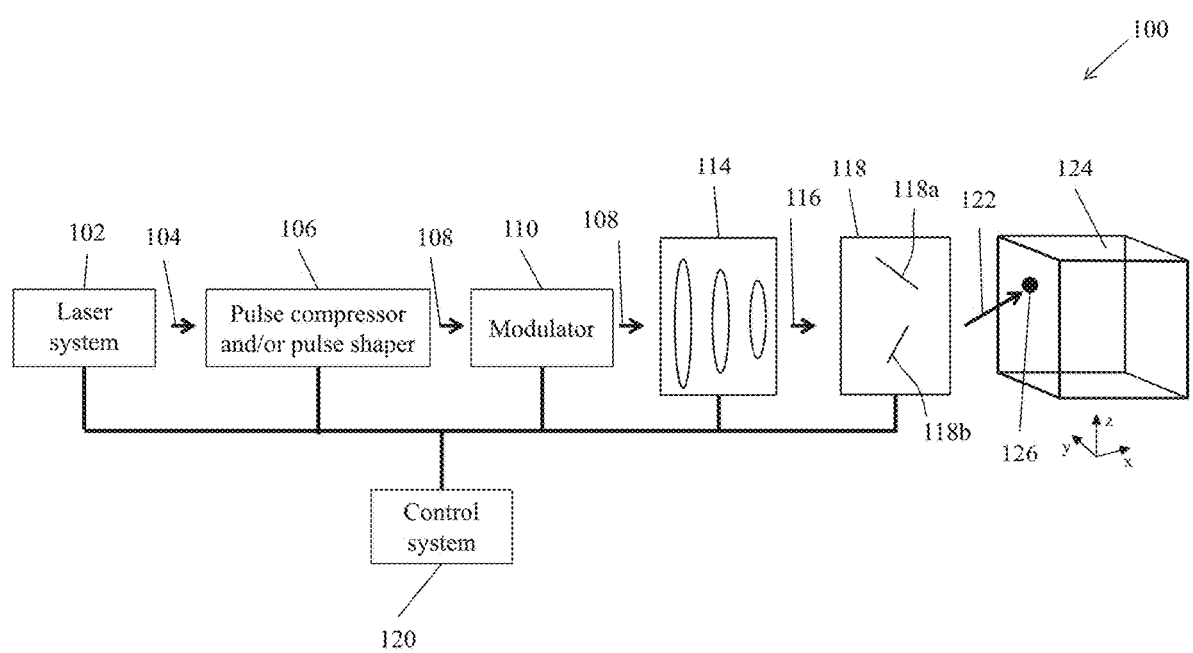
FIG. 1 is a schematic representation of a three-dimensional display system that includes a laser source, a pulse compressor and/or a pulse shaper, a modulator, a focusing system, a mirror system, a display medium, and fluorescent materials.

FIG. 1 schematically depicts a system 100 for generating 3D volumetric images in a display medium according to one embodiment of the present teachings. The system 100 includes a plurality of functional elements that can be organized in a plurality of ways and controlled by one or more control systems.

In particular, the system 100 includes a laser radiation source 102 for generating a laser beam 104. By way of example, the laser radiation source 102 can be controlled by a controller 120 and can be used to generate a plurality of ultrashort pulse sequences. The term "ultrashort pulse" as used herein refers to a radiation pulse (e.g., a laser pulse) having a duration (herein also referred to a pulse width) of equal to or less than 1 nanosecond. By way of example, the pulse duration can be in a range of about 5 femtoseconds (fs) to about 1 nanosecond, e.g., in a range of about 10 fs to about 100 picoseconds (ps), in a range of about 100 fs to about 1 ps, or in a range of about 500 fs to about 1 ps. A variety of pulse repetition rates can be employed, e.g., based on a particular image-generation application. By way of example, the pulse repetition rate can be in a range of about 1 MHz to about 1 GHz, though other pulse repetition rates can also be employed. Without any loss of generality, in this embodiment the laser source generates pulses with a pulse duration between 5 femtoseconds and 500 picoseconds, a pulse repetition rate between 1 MHz and 1 GHz, a central pulse wavelength between 700 nm and 1600 nm, and a pulse energy between 1 nJ and 1000 nJ. In some embodiments, the radiation fluence can be as small as about $0.1$ $J/m^2$ to about $50$ $kJ/m^2$. In some embodiments, the radiation pulses can be focused into a focal volume within the display medium such that the radiation fluence within at least a portion of the focal volume can be in a range of about $0.5$ $J/m^2$ to about $20$ $kJ/m^2$, e.g., in a range of about $1$ $J/m^2$ to about $1$ $kJ/m^2$, or in a range of about $5$ $J/m^2$ to about $500$ $J/m^2$.

In this embodiment, the laser system 100 can be a Titanium: Sapphire pulsed laser. Examples of a suitable laser system that can be used as the laser radiation source 100 include, without limitation, the FemtoFiber Pro NIR and UCP systems (marketed by Toptica Photonics, Inc. of Victor, U.S.A.), the Mendocino and Carmel systems (marketed by Calmar Laser, Inc. of Palo Alto, U.S.A.), and the Femtolite system (marketed by IMRA, Inc. of Ann Arbor, U.S.A.).

The system 100 also includes a pulse compressor or pulse shaper 106 that receives and controls the laser radiation beam 104. In the present embodiment, the pulse compressor or pulse shaper 106 can be controlled by a control system 120, and can be wholly or partially integrated in the laser system 102 or can be external to the laser system 102. The role of the pulse compressor and/or pulse shaper is to control the pulse (chirp) and to obtain an optimal pulse duration for the multiphoton absorption (MPA) inside a 3D display medium 124. As pulses propagate through a material, such as air or glass, dispersion causes different spectral components of the pulse to travel at different velocities, leading to a spreading of pulses under normal conditions. The spreading of the pulse lengthens its duration, and decreases its peak power. Pulse duration is particularly affected when travelling through glass. Pulse compression optics (such as pulse shaper and/or prism pairs) are commonly used in the art to shorten or lengthen pulses that suffer dispersion after propagating through air, lenses, and other optics. Examples of pulse compressors and shapers that can be used to dynamically adjust the pulse chirp and/or shape include, without limitation, the FemtoFit, FemtoJock, and MIIPS-HD systems (marketed by Biophotonic Solutions, Inc. of East Lansing, U.S.A.). As discussed in more detail below, in some embodiments of a system according to the present teachings, the pulse compressor and/or pulse shaper can be employed to ensure that the pulse intensity at a focal volume within the display medium 124 is sufficiently high to cause multiphoton absorption of the radiation.

Figure 4:
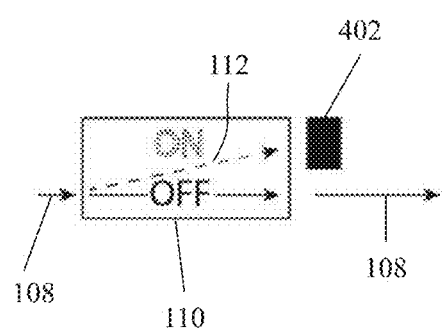
FIG. 4 is a schematic representation of a modulator along with incident and transmitted light.

The system 100 also includes a modulator 110 that receives and controls a laser beam 108 transmitted by the pulse compressor and/or pulse shaper 106. In the present embodiment, the modulator 110 can be controlled by the control system 120 to selectively shutter the laser beam, or allow its passage to the display medium. As in some embodiments, a high rate of illumination of different volumetric voxels within the display medium 124 may be required. The shutter, in such embodiments, can be capable of moving the beam in and out of the beam path at a high speed. By way of example, in some embodiments, acousto-optic modulators are employed as the modulator 110, which can operate at high repetition rates to change the path of the laser in and out of the beam path leading to the display medium. When moved out of the beam path, the laser can be blocked by a beam dump (not shown). By way of further illustration, FIG. 4 provides a more detailed view of the modulator 110 and shows that the modulator can be used to change the propagation direction of the incident laser beam 108 to a laser beam 112 (e.g., when the modulator is in an ON state), which is captured by a beam block 402, or allow the passage of the laser beam 108 along its original propagation path. Example of suitable acousto optic modulator includes the NEOS 15200-0.15-0.8. Further examples of suitable acoustic optic modulators may include, without limitation, the 17440-FOA AOM, the AOMO 3200-124, the AOMO 3200-1113 (marketed by Gooch & Housego, Inc. of Bedford, U.S.A.).

An acousto-optic modulator can also be used to scan the beam in one dimension (1D) or two dimensions (2D) (e.g., along x- and/or y-axes) within the display medium 124 at high speeds. The position of the modulator 110, e.g., in the form of an acousto-optic modulator, is not limited to that shown in FIG. 1, but rather the modulator can be placed at different positions along the beam's propagation path. e.g., after the focusing optics.

The system 100 also includes a focusing system 114 that receives and focuses the laser beam 108. In the present embodiment, the focusing system 114 can be controlled by the control system 120 and can include one or more lenses. The lenses are used to control the focusing of the beam inside the display medium 124. The term "focal volume" as used herein refers to a volume within the display medium that is extended axially about a focal plane, a plane at which a focused radiation beam exhibits a minimum beam waist and a maximum intensity, up to a plane at which the beam exhibits a beam waist that is larger than the minimum beam waist by a factor of about $\sqrt{2}$. The intensity of the laser pulses within a focal volume is sufficiently high to cause multiphoton absorption of the radiation within the volume, and hence cause emission of radiation from that volume, whereas the intensity of the laser pulse outside the focal volume is generally below a threshold needed for multiphoton absorption. In this manner, a laser pulse can propagate through the display medium 124, which is formed of a material that is substantially transparent at the wavelength of the laser pulse, without much absorption until it reaches the focal volume in which it can deposit its energy via multiphoton (and typically two-photon) absorption. Hence, controlling the location of the focus inside the display medium can provide longitudinal (depth) control over where the emission light is produced. The focusing optics focal distance could be variable and computer controlled (e.g., it can be controlled via the control system 120) to provide a dynamic depth control of where the emission occurs inside the display medium.

Figure 5:
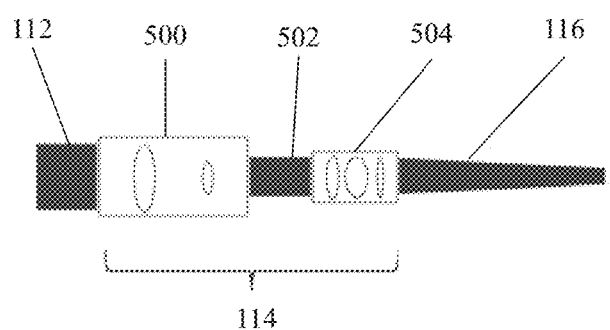
FIG. 5 is a schematic representation of a focusing system suitable for use in a three-dimensional display system according to the present teachings.

FIG. 5 provides a more detailed view of the focusing system 114. In the present embodiment, one or more lenses can be used to change the incident laser beam 112 to a laser beam 116, which has the required convergence so as to be focused within a desired focal volume inside the display medium. By way of example, the focusing system can include, without limitation, a beam expander or telescope 500 to change the incident laser beam 112 to a laser beam 502 having a different size, and one or more variable lenses 504 to change the incident laser beam 502 to a laser beam 116 having a different convergence profile with a focal point within a desired depth of the display medium. Example of variable focus lenses include, without limitation, the Arctic 39N0 liquid lens (marketed by Varioptic, Inc. of Southfield, U.S.A.).

Figure 3:
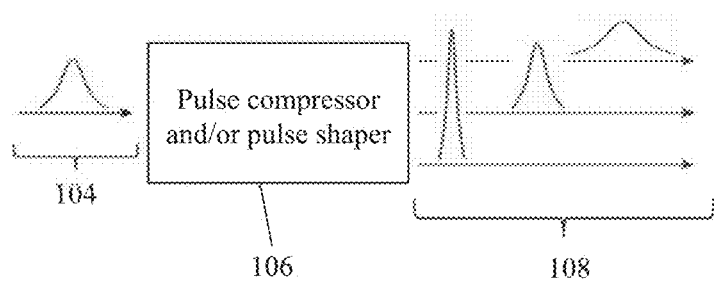
FIG. 3 is a schematic representation of a pulse compressor and/or pulse shaper along with incident and transmitted light where one incident pulse of a specific duration is modified and transmitted as one pulse of potentially longer or shorter duration.

In some embodiments, the pulse compressor and/or pulse shaper can also contribute to controlling the depth at which a laser pulse will have sufficient intensity to initiate multiphoton absorption. For example, the pulse compressor and/or pulse shaper can adjust the pulse chirp such that the change in the pulse width due to dispersion as the pulse propagates to the display medium, and then within the display medium, would result in a minimum pulse width and/or high peak intensity at a desired depth within the display medium. Thus, the pulse compressor and/or pulse shaper can control the depth inside the display medium at which multiphoton absorption and photoluminescence occur. By way of further illustration, FIG. 3 shows that the pulse compressor and/or pulse shaper can chirp and/or shorten or lengthen the laser pulse 104 (and/or change their shape), as shown by the three examples 108, to control the location of the maximum pulse intensity within the display medium.

Thus, in some embodiments, the combination of the pulse compressor and/or pulse shaper 106 and the focusing lenses 114 can precisely control the depth of the volumetric voxel (the distance along z-axis from a face of the display medium on which the pulse is incident or the distance along the axis of propagation of the pulse from a face of the display medium on which the pulse is incident) in which multiphoton absorption, and hence light emission, occurs.

The system 100 also includes a scanning mirror system 118 that receives and controls a laser beam 116. In the present embodiment, the scanning mirror system 118 can be controlled by the control system 120 and can be used, for example, in conjunction with an acousto-optic modulator, to control the positioning of the laser pulses within the display medium 114 along x and/or y axis. In some embodiments, the scanning mirror system 118 is used alone, without the acousto-optic modulator, to control the positioning of the laser pulses along the x and/or y direction. By way of example, in some embodiments, the scanning mirror system includes two mirrors 118a and 118b that are configured to rotate about two orthogonal axes to control the positioning of the laser beam in two dimensions (in this case along x and/or y axes). In some embodiments, the scanning mirror system includes two mirrors that are configured such that one mirror rotates and one mirror rotates and translates to control the positioning of the laser beam in two dimensions (in this case along x and/or y axes). In some embodiments, the scanning mirror system includes two mirrors that are configured such that both mirrors rotate and translate to control the positioning of the laser beam in two dimensions (in this case along x and/or y axes). In some embodiments, the scanning mirror system includes more than two mirrors that rotate and translate to control the positioning of the laser beam in two dimensions (in this case along x and/or y axes). The combination of such two-dimensional positioning of the laser beam and the depth control of the laser pulse intensity, as discussed above, can allow the illumination of any desired volumetric voxel within the display medium 124.

Figure 6:
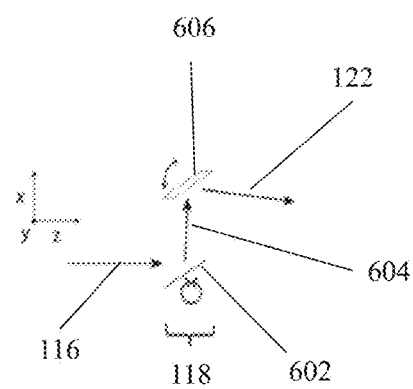
FIG. 6 is a schematic representation of a scanning mirror system suitable for use in a three-dimensional display system according to the present teachings.

By way of further illustration, FIG. 6 provides a more detailed view of an exemplary implementation of the scanning mirror system 118. By way of example, the scanning mirror system includes one or more mirrors 602/606 that collectively change the propagation direction of the laser beam 116 so as to facilitate directing the beam (as laser beam 122) to a desired location within the display medium 124. The combination of beam steering and depth control of light intensity, as discussed above, allows the precise x-, y- and z-positioning of the voxel in which light emission occurs.

Figure 7:
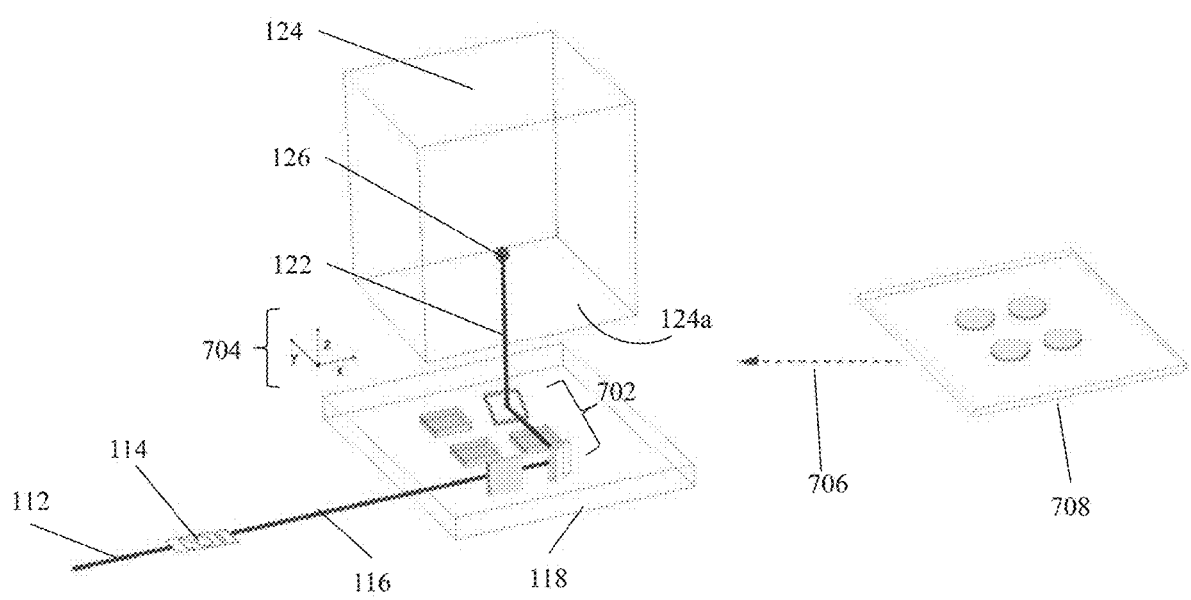
FIG. 7 is a schematic representation of a scanning mirrors array system and a lens array system suitable for use in a three-dimensional display system according to the present teachings.

FIG. 7 provides a schematic view of another implementation of the scanning mirror system 118. By way of example, the scanning mirror system 118 has a system 702 having two or more mirrors (e.g., a microelectromechanical system (MEMS) array of metal or dielectric coated mirrors) that change the propagation direction of an incident laser beam 116 to a laser beam 122 that propagates to a desired focal point 126 in the display medium 124. In this exemplary embodiment, the scanning system is disposed below the display medium with the light entering the display medium via a bottom facet 124a thereof. This arrangement advantageously allows a viewer to view a three-dimensional image formed within the display medium via all the other facets thereof.

Referring again to FIG. 7, the number of mirrors can vary, depending on whether each mirror controls multiple (x,y) locations in the display, or a single (x,y) position. For example, for a square 1000×1000 (1K×1K) plane resolution display (1 million 2D pixels), a 1K×1K mirror array (or 1K×1.001K) would allow for each (x,y) voxel coordinate to be controlled by one pair of mirrors. An additional row of mirrors (additional 1K mirrors in this example) could be used as steering mirrors as illustrated in 702. Mapping each (x,y) position with single pairs of mirrors in the array helps reduce angular effects of the positioning system on the laser beam between the arrays system 702 and the display medium 124. Thus, in this 1-to-1 mapping example, optical reflections from the display medium surface, and total amount of dispersion inside the display medium are not substantially different between voxels that are in the same (x,y) plane of the display medium. This embodiment also provides the convenience of Cartesian mapping when depth is taken into account. This can simplify the 3D voxel positioning when coordinating with the focusing system 114, the pulse compressor and/or pulse shaper 106, or the combination of both 114 and 106 systems.

Referring again to FIG. 7, the scanning mirror array system 702 can be designed such that the mirror placements allow for additional optical path length to be created for any (x,y) position. For example, the furthest mirror may require $(x_{max}+y_{max})$ travel and the closest may require $(x_{min}+y_{min})$ travel along the mirror array. The mirror configurations can be set such that all optical paths are $(x_{max}+y_{max})$: the closer mirrors will require extra optical travel distance around the mirror array before the beam is reflected out of plane. In some embodiments, this can be utilized to mitigate the differences in pulse dispersion and beam focusing for illuminating voxels in the same (x,y) plane inside the display medium 124, such that beam focusing and pulse dispersion anywhere in a specific (x,y) plane of the display are not substantially different. Another compensation method that can be employed is to introduce a lens array or micro-lens array 708 with varying focal lengths between the display medium 124 and the scanning mirror system 118. This can be used to compensate for focusing differences between positions in a (x,y) plane due to different optical path lengths. The lenses can be either refractive or diffractive.

Example of suitable commercially available systems that can be employed as the scanning system 118 include, without limitation, the GSV202 scanning galvo mirror system (from ThorLabs, Inc.), the Polygonal Scanners system (marked by Lincoln Laser, Inc. of Phoenix, U.S.A.), and the Piezo Steering Mirrors system (market by PI, Inc. of Auburn, U.S.A.).

As noted above, the image display system 100 also includes a display medium 124 that receives and absorbs a laser beam 122. In the present embodiment, the medium can be made of one or a mixture of organic, or inorganic substances that may or may not have particles, nanoparticles, dyes, quantum dots, metamaterials, metal particles, dopants, rare-earth ions or particles dispersed or suspended therein. In many embodiments, the laser beam 122 is used to generate light emission from a plurality of discrete volumetric voxels of the display medium so as to form a three-dimensional image, which can be viewed via one or more facets of the display medium. Some examples of materials suitable for forming the display medium 124 can include, without limitation, terbium doped borosilicate glasses, copper/terbium co-doped borosilicate glasses, europium/terbium co-doped borosilicate glasses and erbium doped glasses.

In many embodiments of the present teachings, the display medium 124 comprises one or more photoluminescence emitting substances. In many embodiments of the present teaching, the photoluminescence emitting substances are fluorescence emitting substances (herein "fluorophores"). The photoluminescent substances are embedded within one or more of the volumetric voxels of the display medium where they absorb photons coming from the laser beam 122 and emit light that enable the 3D display system described herein. This absorption/emission process can be achieved through the absorption of more than one photon, preferably two. The excitation intensity can be selected to cause multiphoton absorption of the laser radiation within the targeted voxels and to be below a threshold value so as to prevent damage to the display medium. Also, the excitation wavelength can be selected to be different than a wavelength that would cause linear absorption in the display medium while allowing multiphoton absorption. Some examples of photoluminescent substances that can be embedded into the display medium 124 can include, without limitation, terbium, europium, erbium, fluorescein, coumarin, and rhodamine.

Figure 2:
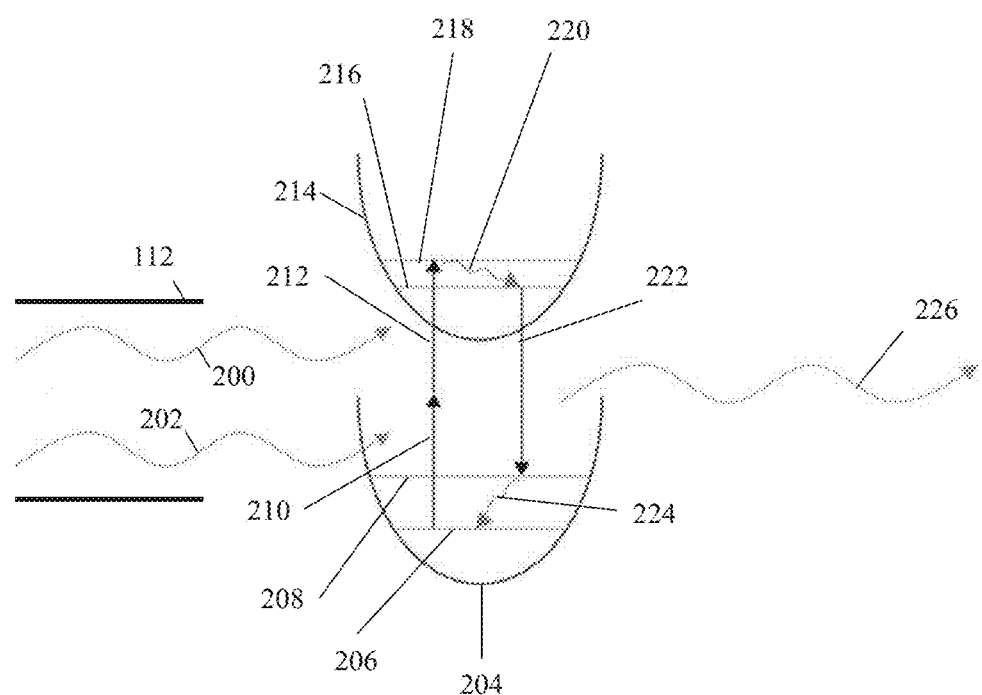
FIG. 2 is a schematic representation of a multiphoton absorption/emission process where an electron is excited to a higher energy level by the multiphoton absorption of two photons and subsequently returned to a lower energy level by emitting a single photon.

FIG. 2 schematically depicts the multiphoton absorption/emission process mediated by the fluorescent substances described above. By way of illustration and without being limited to any particular theory, the 3D display system described herein relies on multiphoton absorption of light 122, 200 and 202 in one or more targeted volumetric voxels (focal volumes) to cause emission of light, e.g., at a different wavelength or wavelength range relative to the excitation light, from those voxels according to a predefined pattern. More specifically, and without being limited to any particular theory, one or more photons 200 and 202 from the laser beam 122 excite the electrons from a fluorescent substance embedded in the display medium. The initial ground state 204 of these electrons has different energy levels 206 and 208 from which the electrons are excited 210 and 212. Once excited, the electrons reach their excited state 214 and different energy levels 216 and 218 before relaxing back 220, 222 and 224 to their ground state. During the relaxation process, the electrons lose energy and emit photon 226. The emitted photon is of higher energy than one of the absorbed photons and additional energy can be dissipated through non-radiative means, such as phonons. The relaxation generates the light necessary for the 3D display to function.

The 3D display system described herein relies on intensity dependent absorption of light in a substantially transparent medium that leads to the emission of light, e.g., of a different wavelength or wavelength range, from one or more targeted voxel locations. More specifically, the medium is substantially transparent when the light intensity is low, and absorbs a significant amount of light when the light intensity is high. This type of absorption can be achieved through multiphoton absorption alone or combined with heating.

For example, many types of glass are transparent to light in the visible and near-infrared wavelength ranges, but absorb light in the ultraviolet (UV) range (note that wavelength is inversely proportional to photon energy). Under low light intensity, the interaction between photons and the glass medium is linear: photons in the visible and near-infrared wavelength ranges do not have the requisite energy to excite electrons and be absorbed (making the glass transparent) while photons in the UV range do have enough energy to be absorbed (reducing the glass transparency). In the visible and near-infrared ranges, even though a single photon may not be able to excite an electron in the glass, it is possible that two or more photons together may have the collective energy to bridge the energy gap in the glass. For example, a photon of 300 nm wavelength has the same energy as two photons of 600 nm wavelength. For multiple photons to bridge the energy gap together, they need to be absorbed simultaneously; this falls under the regime of nonlinear absorption, or multiphoton absorption (MPA). The linear absorption cross-section (in the ultraviolet wavelength range in this case) is orders of magnitude higher than the MPA cross-section. For MPA to occur, there needs to be a high density of photons in time and space.

In use, a plurality of volumetric voxels within the display medium are illuminated to elicit emission of light from those voxels according to a predefined pattern to form a 3D image. By way of example, the controller 120 can include the instructions for illuminating the voxels according to the predefined pattern. The controller 120 can use those instructions to compute various parameters of the system, such as, the laser pulse energy and repetition, the dispersion compensation/shaping of the laser pulses executed by the pulse compressor and/or pulse shaper, and the operation of the modulator, as well as the focusing and scanning systems, so that the pulses are directed to specific voxels within the display medium such that the emission of light from those voxels would result in the generation of an image.

In some embodiments, rather than illuminating a plurality of volumetric voxels sequentially in time, a plurality of volumetric voxels can be concurrently illuminated to cause emission of light therefrom. For example, a one or two-dimensional array of voxels can be illuminated concurrently and then be shifted so as to illuminate concurrently a different set of voxels within the display medium. In this manner, all the requisite voxels within the display medium can be illuminated according to a predefined pattern.

Figure 8:
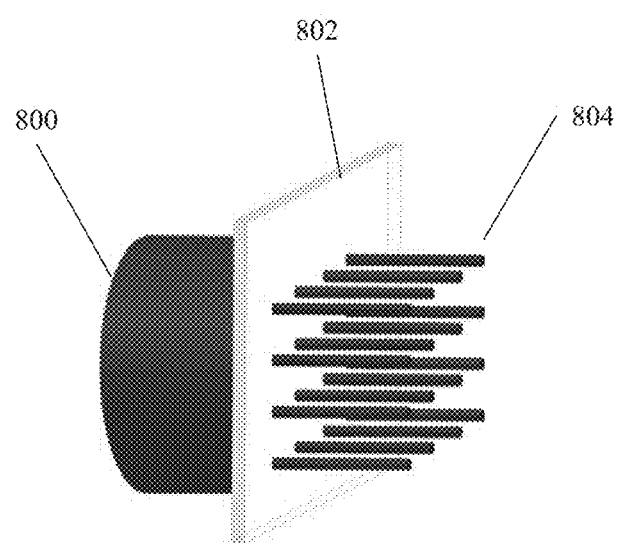
FIG. 8 is a schematic representation of a beam splitter suitable for use in a three-dimensional display system according to the present teachings.

By way of example, FIG. 8 schematically depicts a beam splitter 802 that can be embedded within the system 100 to split an incident laser beam 800 into multiple laser beams 804. In some embodiments, the beam splitter 802 can be optically coupled to above scanning mirror system 702 such that each of the beams 804 is steered via a subset of mirrors of the scanning system 702 to a desired voxel within the display medium such that a plurality of voxels are concurrently illuminated so as to cause emission of light from those voxels. The beam splitter 802 can be implemented in a variety of different ways. By way of example, it can be in the form of a 2D diffractive optical element (DOE) beam splitter for generating multiple beams out of a single beam.

Referring again to FIG. 8, a beam splitter 802 can advantageously allow increased system's throughput, i.e., the number of voxels illuminated per unit time. Further, in some embodiments, the use of the beam splitter 802 can eliminate the need for the scanning system 118. By way of example, a display with a high resolution of 1K×1K×1K pixels (1 billion pixels, or 1 GP) would have a volumetric display of 1 billion voxels (1 gigavoxel, or 1 GV) (i.e., by comparison, standard Full High Definition (FHD) displays have approximately 2 megapixels, or 2 MP). To have a display with a frame rate of 30 Hz, 30 billion pulses per second from the laser (30 GHz) need to be steered into the display medium. However, if the laser beam is split into 100 beams by a beam splitter, the requirement would be reduced to 300 million pulses per second (300 MHz). Thus, the use of the beam splitter can result in an operating frequency that is 100 times less than that needed without the beam splitter. In this example, a full beam would need to be steered over 1,000×1,000 pixels in $\frac{1}{30}^{th}$ of a millisecond in the (x,y) plane, and the entire 1,000 pixel depth (z) would need to be scanned in $\frac{1}{30}^{th}$ of a second. This can equate to a 30 GHz scanning rate for the (x,y) scanning system and a 30 KHz scanning rate for the depth (z) scanning system. However, a beam that is split into 100 beams would allow generating the same image using an (x,y) scanning rate of 300 MHz and a (z) scanning rate of 30 KHz.

Referring again to FIG. 8 and by way of example, a display with a high resolution of 500×500×500 pixels (125 million pixels, or 125 MP) would have a volumetric display of 125 million voxels (125 megavoxel, or 125 MV). To have a display with a frame rate of 10 Hz using a beam splitter 802 that splits a laser beam into 100 beams, a laser beam with a 12.5 MHz laser repetition rate and a 12.5 MHz frequency of (x,y) scanning rate and a 5 KHz frequency of depth positioning in the z-axis would be needed.

Figure 9:
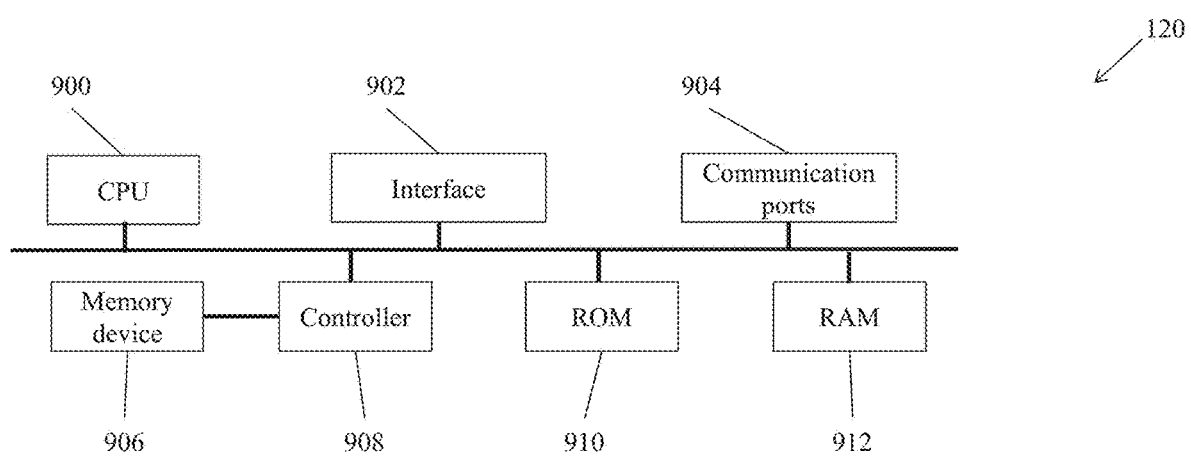
FIG. 9 is a schematic representation of a control system of an embodiment of a three-dimensional display system, which includes a central processing unit, an interface, communication ports, a memory device, a controller, read-only memory, and random-access memory.

As noted above, the system 100 includes a plurality of functional elements that can be controlled by one or more control systems. By way of example, FIG. 9 schematically depicts an exemplary implementation of the control system 120, which includes a central processing unit (CPU) 900 for controlling the operation of one or more elements of the system 100. The control system also includes an interface 902, communication ports 904 for communicating with various components of the system, memory device 906, a controller 908, a random access memo (RAM) 910, and a read only memory (ROM) 910. By way of example, instructions for forming an image can be stored in ROM 912, or, RAM 910, or other memory device 906, and the processor can access those instructions to control the operation of various functional units of the system under the control of the control system 120. By way of example, the instructions can provide a map of the locations of the volumetric voxels within the display medium as well as the temporal sequence according to which those voxels need to be illuminated. This processor can use this information to steer the laser pulses, via application of appropriate signals to the pulse compressor and/or pulse shaper 106, the modulator 110, the focusing system 114 and the scanning system 118, to those locations and at appropriate times.

Figure 10:
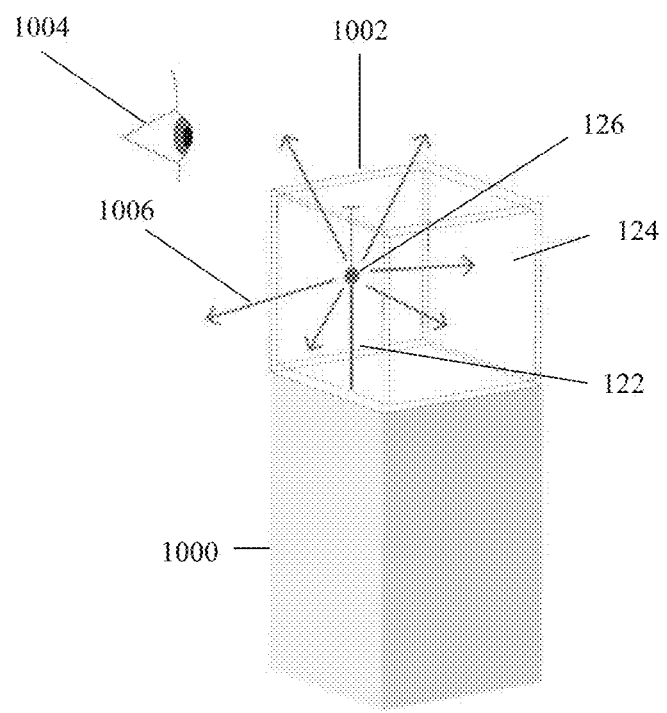
FIG. 10 is a schematic representation of a three-dimensional volumetric display system configuration according to an embodiment.

In some embodiments, a protection barrier can be employed to protect a viewer's eyes from the laser pulses that are applied to the display medium. By way of example, FIG. 10 schematically depicts an embodiment of the system 100, which includes an optical protection barrier 1002 that encases the display medium 124 so to block the laser light 122 from exiting the display medium to reach a viewer 1004, but let the display emission wavelength 1006 propagate through to the viewer. Some examples of optical protection barriers 1002 can include, without limitation, one or a combination of M-rated materials such as specialized glasses, or polycarbonates, or single layer laser coatings, or multilayer laser coatings. Also, the various elements of the system 100 such as the laser, optical, electrical, mechanical and computer systems 1000 can be contained below the display medium inside a protection barrier.

Figure 11:
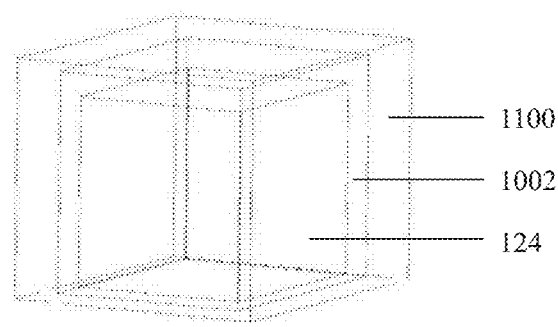
FIG. 11 is a schematic representation of an integrated display medium along with different components such as optical protection barrier and tactile interaction system.

In some embodiments, as schematically depicted in FIG. 11, the display medium 124 can be integrated with a tactile interaction system 1100. The tactile interaction system 1100 can be, without limitation, resistive or capacitive touchscreens. The touchscreen can be highly transparent to the wavelengths emitted by the display medium while providing surfaces with which a user can interact using touch. The interaction system can also be based on tracking camera systems, which would monitor the users' motion near the display surface and may or may not necessitate direct touch.

Figure 12:
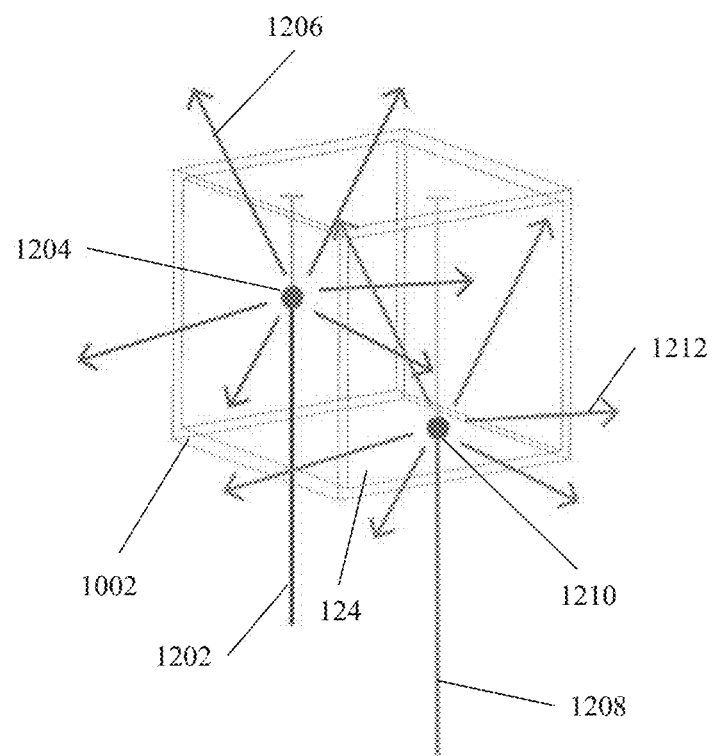
FIG. 12 is a schematic representation of a multicolor three-dimensional volumetric display system according to an embodiment.

In some embodiments, multiple colors can be achieved through a number of ways using the system 100. FIG. 12 schematically depicts, by way of example, multiple excitation wavelengths 1202 and 1208 that are irradiated onto the display medium 124 to generate emission wavelengths 1206 and 1212 of different colors. A single laser with multiple emission wavelengths can be used to irradiate the display medium at different wavelengths so as to induce emissions at different wavelengths. Multiple lasers generating radiation at different wavelengths can also be used to induce emissions at different wavelengths. Furthermore, a pulse intensity and a beam polarization control can be used to change the emission wavelength colors, e.g., variable attenuators or liquid crystal arrays can be used for intensity and polarization control. A single light source may generate emission with multiple colors by tuning pulse energy and/or pulse shape. For example, tuning the intensity to obtain 3-photon absorption versus 2-photon absorption may produce emission of different colors from the display medium.

In some embodiments, if the emission from the display has multiple wavelengths, or is broadband, filters can be used to produce different colors. For example, filters can be used to transmit, without limitation, either red, green, or blue light from white light when they are designed and set to absorb, reflect or scatter specific wavelengths or ranges of wavelengths. Similarly, the emission wavelength that exits the display device can be controlled as a function of time and position by tuning filter parameters to specific colors. For example, liquid crystal arrays can be placed on the display medium, similar to the way optical protection barrier 1002 and tactile interaction system 1100 are positioned in FIG. 11, to control emission wavelengths that are transmitted or blocked. Thus, the pixels of the liquid crystal arrays can be varied over time at high frequencies to transmit the desired colors for viewers. In this example, single image frames would be separated by their color components into multiple image frames, and their scanning into the display medium would be coordinated with the liquid crystal filters to produce the desired multi-color images for viewers. For example, if using an RGB color gamut, an image frame can be broken down into red, green, and blue images. Each of those images would then be scanned into the display medium in rapid succession while liquid crystal filters simultaneously allow transmission of the corresponding red, green, or blue light. The viewer is then able to see a reconstructed full color image.

Figure 13:
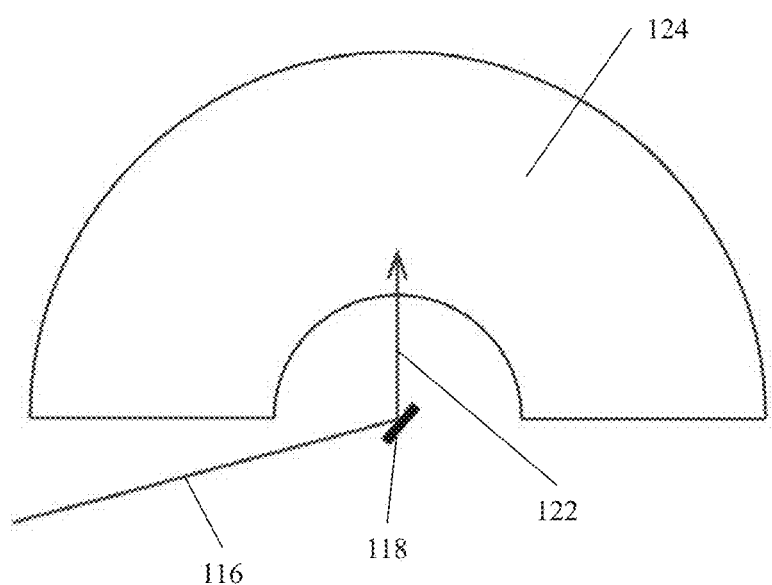
FIG. 13 is a schematic representation of a spherically shaped display medium according to an embodiment.

The display medium 124 of the system 100 can have different shapes. By way of example, it can be prism-shaped, polygonal, or can have some other volumetric shapes. FIG. 13 schematically depicts, by way of example, a 2D projection of a spherically shaped display medium. This type of system can be used to reduce some complexities of the beam positioning. For example, the image coordinates can be transformed into spherical coordinates and the voxel positioning can occur simply through steering that is centered at the sphere's center using a scanning mirror system 118 that directs the laser beam 116 and 122. In some instances, this type of setup can simplify the coordination of depth and lateral positioning subsystems. In this example, the amount of dispersion, reflection and focusing experienced by the laser pulses at different locations within any single spherical layer is not substantially different. This can help reduce the compensations needed for optical path length, surface reflection, and focusing for voxels at different locations in a spherical shell of the same radius.

The invention claimed is:

1. A display system, comprising:
a laser for generating a plurality of laser pulses having a common central wavelength;
a solid display medium being substantially transparent to the plurality of laser pulses and having a plurality of voxels;
a photoluminescent material embedded in the plurality of voxels;
a control system configured to focus the plurality of laser pulses into one or more targeted voxels of the solid display medium according to a predefined pattern, to cause multi-photon absorption by the photoluminescent material within the one or more targeted voxels and to induce an emission of photons from the photoluminescent material within the one or more targeted voxels, the emission being visible light having a wavelength that is shorter than that of the common central wavelength,
wherein the solid display medium is substantially transparent to the visible light, the emission of the visible light from the one or more targeted voxels in the predefined pattern generating a three-dimensional image within the solid display medium.

2. The display system of claim 1, wherein said plurality of laser pulses has a common spectrum.

3. The display system of claim 1, wherein said common central wavelength is in a range of about 700 nm to about 1600 nm.

4. The display system of claim 1, wherein said plurality of laser pulses exhibit a fluence in said one or more targeted voxels less than a damage threshold.

5. The display system of claim 4, wherein said fluence is in a range of about 0.1 $J/m^2$ to about 50 $kJ/m^2$.

6. The display system of claim 1, wherein said plurality of laser pulses have an energy in a range of about 1 nJ to about 1000 nJ.

7. The display system of claim 1, wherein said plurality of laser pulses have a duration in a range of about 10 fs to about 100 picoseconds.

8. The display system of claim 1, wherein said laser is a single laser system.

9. The display system of claim 8, wherein said single laser system is a Ti:sapphire laser.

10. The display system of claim 8, wherein said single laser system is a pulsed fiber laser.

11. The display system of claim 1, wherein said laser generates the plurality of laser pulses at a pulse repetition rate in a range of about 1 MHz to about 1 GHz.

12. The display system of claim 1, wherein said control system comprises a scanner for directing said plurality of laser pulses to said one or more targeted voxels.

13. The display system of claim 12, wherein said scanner is configured to direct the plurality of laser pulses to said one or more targeted voxels in accordance with the predefined pattern so as to form said three-dimensional image.

14. The display system of claim 12, wherein said scanner comprises a modulator.

15. The display system of claim 14, wherein said modulator is an acousto-optic modulator.

16. The display system of claim 1, wherein said control system comprises a pulse shaper configured to process said plurality of laser pulses.

17. The display system of claim 16, wherein the pulse shaper includes a pulse compressor.

18. The display system of claim 1, wherein said control system comprises focusing optics configured to focus said plurality of laser pulses in said solid display medium.

19. The display system of claim 1, wherein said solid display medium comprises at least one of an organic substance, an inorganic substance, a dye, a metamaterial, quantum dots, nanoparticles, metal particles, a dopant and rare-earth ions.

20. The display system of claim 1, wherein the solid display medium is at least partially covered by a protective coating.

21. The display system of claim 8, wherein said single laser system is disposed below said solid display medium.

* * * * *